United States Patent
Kim et al.

(10) Patent No.: US 10,105,816 B2
(45) Date of Patent: Oct. 23, 2018

(54) DEVICE FOR DETACHING/ATTACHING HAND GRINDER POLISHING DISK

(71) Applicant: E & Q ONE-TOUCH, Buk-gu, Ulsan (KR)

(72) Inventors: Chang-Seong Kim, Dong-gu Ulsan (KR); Kyung-Jin Kim, Dong-gu Daegu (KR)

(73) Assignee: E & Q ONE-TOUCH, Ulsan (KR)

( * ) Notice: Subject to any disclaimer, the term of this patent is extended or adjusted under 35 U.S.C. 154(b) by 0 days.

(21) Appl. No.: 15/529,303

(22) PCT Filed: Mar. 16, 2015

(86) PCT No.: PCT/KR2015/002507
§ 371 (c)(1),
(2) Date: May 30, 2017

(87) PCT Pub. No.: WO2016/085052
PCT Pub. Date: Jun. 2, 2016

(65) Prior Publication Data
US 2017/0259398 A1    Sep. 14, 2017

(30) Foreign Application Priority Data

Nov. 25, 2014    (KR) ........................ 10-2014-0165473

(51) Int. Cl.
*B23B 31/10*        (2006.01)
*B23B 31/19*        (2006.01)
(Continued)

(52) U.S. Cl.
CPC ............ *B24B 45/006* (2013.01); *B23B 31/10* (2013.01); *B23B 31/19* (2013.01); *B24B 41/007* (2013.01);
(Continued)

(58) Field of Classification Search
CPC ......... B23B 31/10; B23B 31/19; B24B 45/00; B24B 45/006; B27B 5/30; Y10T 279/33
See application file for complete search history.

(56) References Cited

U.S. PATENT DOCUMENTS 3,912,411 A * 10/1975 Moffat .................. B24B 45/006
                                                       403/259
6,645,058 B2 * 11/2003 Puzio .................... B24B 45/006
                                                       451/365
(Continued)

FOREIGN PATENT DOCUMENTS

DE    102010041055 A1 * 10/2011 ............. B23Q 3/183
JP       2012-218151 A      11/2012
(Continued)

OTHER PUBLICATIONS

International Search Report dated Jul. 3, 2015, issued in International Application No. PCT/KR2015/002507.

*Primary Examiner* — Eric A Gates
(74) *Attorney, Agent, or Firm* — Kilpatrick Townsend & Stockton LLP (57) ABSTRACT

The present invention relates to a device for detaching/attaching a hand grinder polishing disk, the device being clamped on the rotating shaft of a grinder main body so as to enable the easier and quicker detachment/attachment of a consumable polishing disk used for finishing, cutting, severing, etc. the surface of a target object, or to enable the definite prevention of loosening, vibration phenomenon, etc. The present invention comprises: a grinder main body which has a rotating shaft operating at a high speed by means of air pressure or the driving of an electric motor; a power transmission member which has a stopping protrusion formed on the upper end part of the body thereof and a hexagonal body including a flange formed on the center part of the body thereof, and which is clamped on the rotating shaft of the (Continued)

grinder main body by a fixing bolt; a stopper main body which has a hexagonal hole formed on the inner circumferential surface thereof for accommodating the power transmission member, and which has an arc-shaped seat groove formed on the circumference of the hexagonal hole so as to face each other; a pair of upper and lower rotating plates which are each fitted in a flat plate portion on the upper end of the stopper main body; and a disk holder which has an upper fixing ring and a lower support plate assembled on the power transmission member for fixing an abrasive material.

7 Claims, 11 Drawing Sheets (51) Int. Cl.
*B24B 45/00* (2006.01)
*B24B 41/00* (2006.01)
B24B 23/02 (2006.01)
B27B 5/30 (2006.01)

(52) U.S. Cl.
CPC ............ *B24B 45/00* (2013.01); *B24B 23/028* (2013.01); *B27B 5/30* (2013.01); *Y10T 279/33* (2015.01)

(56) References Cited

U.S. PATENT DOCUMENTS

| | | | | |
|---|---|---|---|---|
| 9,463,547 | B2* | 10/2016 | Fankhauser | B24B 23/04 |
| 2007/0293380 | A1* | 12/2007 | Kausch | B24B 45/006 |
| | | | | 483/31 |
| 2008/0254725 | A1* | 10/2008 | Henning | B24B 23/02 |
| | | | | 451/510 |
| 2010/0034617 | A1* | 2/2010 | Liao | B24B 45/006 |
| | | | | 411/432 |
| 2015/0251295 | A1* | 9/2015 | Chen | B24B 45/006 |
| | | | | 451/509 |

FOREIGN PATENT DOCUMENTS

| | | |
|---|---|---|
| KR | 10-20090074461 A | 7/2009 |
| KR | 10-20100008489 A | 1/2010 |

* cited by examiner

DEVICE FOR DETACHING/ATTACHING HAND GRINDER POLISHING DISK

CROSS REFERENCE TO RELATED APPLICATIONS

This application is a U.S. National Stage of International Application No. PCT/KR2015/002507, filed Mar. 16, 2015, which claims the benefit of Korean patent Application No. 10-2014-0165473, filed Nov. 25, 2014, the entire contents and disclosures of which are incorporated herein by reference.

TECHNICAL FIELD

The present invention relates to a device that enables a polishing disk (which is consumable goods used for cutting, polishing and grinding an object in a state of being fixed to a rotary shaft of a grinder body) to be easily attached to or detached from a hand grinder in a simple way. In addition, the device prevents the polishing disk from being separated from the grinder in the middle of work, reducing vibration.

BACKGROUND ART

In general, hand grinders used in industrial machines and equipments, shipbuilding, construction and various facilities are used for smoothly polishing uneven surfaces of parts produced through primary operation, particularly before a painting process, and for partially cutting the first raw materials such as pipes, hand bars, steel plates, etc.

In a hand grinder, a rotary shaft rotates at high speed by an operation of an electric motor or air pressure generated when a compressor operates, and simultaneously, a polishing disk assembled with the rotary shaft rotates, polishing a surface of the object formed of stone, metal, or the like to give a gross to the surface, or grinding or cutting any incomplete portions and unwanted edges after a process as a finishing work.

Typical mechanisms for engaging the polishing disk with the rotary shaft of the grinder has been disclosed in Korean Utility Model Laid-Open Publication No. 89-10365 and No. 96-26826. In the prior art, after the rotary shaft of a grinder body is inserted into a hole of the polishing disk, a nut fastens the rotary shaft, or a bolt is inserted into and then fixed to the rotary shaft.

However, since the polishing disk are fastened to the grinder body by means of only the nut or bolt, a clamping force between the polishing disk and the grind body may lower by friction or small vibration of the high-speed rotating polishing disk. Accordingly, a worker may feel uneasy about a possibility of accident arising from that the nut or bolt becomes loose and thus the polishing disk is separated from the grinder body in the middle of work. By way of precaution against such a possibility, the grinder with a fixed cover mounted near the polishing disk has been used at work site.

In addition, when a worn-out polishing disk is replaced after long-term use of the hand grinder, foreign substances such as polishing particles which stick to the nut or the bolt in a state of being hardened are found. Due to these substances, the bolt or nut is not tightly fastened to the rotary shaft of the grinder body and thus any accident arising from that the polishing disk is separated from the grinder body in the middle of work may occur.

Another prior art proposed to solve the problems described above has been disclosed in Korean Patent Laid-Open Publication No. 2009-0074461. In this prior art, a fixing holder is provided on the rotary shaft of the grinder body and a disk-integrated disk holder is fastened to the fixing holder by a screw to prevent the disk from being separated from the fixing holder. In addition, a brake unit mounted at the grinder body enables attachment and detachment of the disk to be more easily and rapidly performed.

However, this prior art is inconvenient in that, when replacing the used disk with new one in the middle of work, the worker must unfasten the screw fastening the used disk holder to the fixing holder and then fasten it again after replacement of the new one. Moreover, this prior art is inconvenient in that the worker must additionally drive a break unit when replacing the used disk.

Another prior art proposed to solve the problems described above has been disclosed in Korean Patent No. 0973157. In this prior art, the disk holder is easily fastened to the rotary shaft of the grinder body by an one-touch method. Accordingly, attachment and detachment of the disk holder can be rapidly performed. In addition, safety keys mounted in a stopper may prevent the disk holder from being separated from the grinder body.

However, the workers had found some drawbacks of this prior art while they had practically used products of this art at work site.

Firstly, the bolt fixing the stopper body to the grinder body may become loose, and thus the polishing disk may be separated from the grinder in the middle of work.

Secondly, since the safety keys are fixed by only ball plungers, the polishing disk may be separated from the grinder due to abrasion caused by long-term use.

Thirdly, if the grinder is used for long time, function of a plate spring for preventing vibration becomes weak, and thus vibration may occur.

Fourthly, an abrasion consumable consisting of many constituent parts becomes a factor increasing manufacture cost, and thus it may weaken price competitiveness of the product in the market.

Fifthly, if the grinder body itself has function of the stopper, the stopper of this art can't exhibit its function.

DISCLOSURE

Technical Problem

The present invention has been made in an effort to provide a device that enables a consumable polishing disk fixed to a rotary shaft of a grinder body to be easily attached to or detached from a hand grinder by one-touch method.

The present invention has been made in another effort to provide a hand grinder in which a polishing disk integrally formed with a disk holder is released from or attached to the grinder by one-touch method in which a user turns a stopper counterclockwise or clockwise with a hand when the polishing disk should be replaced with new one.

The present invention has been made in another effort to provide a hand grinder capable of remarkably lowering manufacturing cost thereof since structure and manufacturing process of an abrasion consumable is relatively simple.

The present invention has been made in another effort to provide a hand grinder capable of preventing a polishing disk from being separated therefrom in the middle of work by using of a power-transmitting member, a separation-preventing structure of a stopper body, such as a disk holder, mounting grooves, and ball plungers, and locking function of the stopper body.

The present invention has been made in another effort to provide a hand grinder capable of reducing vibration occurring in the middle of work by vibration-preventing pads provided between a stopper body and a polishing disk.

Technical Solution

According to the present invention, a device may include: a grinder body including a rotary shaft which is driven by an operation of electric motor or air pressure; a power-transmitting member that includes catching protrusions protruding from a top end of a main body of the power-transmitting member, a flange formed below the catching protrusions, and a hexagonal pillar formed below the flange and that is fixed to the rotary shaft of the grinder body by a fixing bolt; a stopper body including a hexagonal hole that is formed at the center of the stopper body to receive the power-transmitting member therein, and arc-shaped mounting grooves that are formed at the outside of the hexagonal hole to face each other; an upper rotary plate and a lower rotary plate that are mounted on a top of the stopper body; and a disk holder that includes an upper fixing ring and a lower supporting plate which are provided to fix an abrasive therebetween and that is assembled with the power transmitting member, wherein the stopper body is assembled with a pair of safety keys that moves upward and downward on compensation plates, each of the compensation plates being mounted in each of the arc-shaped mounting grooves and having stepped portions, and wherein the upper and lower rotary plates mounted on the stopper body are assembled with a pair of rotation keys.

The power-transmitting member may be fixed to the stopper body when a snap ring is mounted on a lower portion of the power-transmitting member.

Each of the safety keys and rotation keys mounted at the stopper body may serve as a pin, a ball and a reverse gear.

The upper rotary plate may include grooves formed at a top thereof, and vibration-preventing pads, each of which is mounted in each of the grooves in order to prevent the hand grinder from shaking or vibrating in the middle of work.

The lower supporting plate of the disk holder may include circular holes formed at a bottom thereof, which safety keys are inserted in or released from when the disk holder is attached to or detached from the stopper body.

The stopper body may include locking members that operate elastically and that hook or release a pair of protrusions protruding downwardly from the upper rotary plate.

Each of the locking members may include a button, a connection rod which is integrally formed with the button and is caught by a fixing segment attached to the stopper body, a catching protrusion formed at an end of the connection rod, and a spring which supplies an elastic force to the locking member.

Advantageous Effects

According to the present invention, the polishing disk in which an abrasive and a disk holder are formed as an inseparable unit can be easily attached to and detached from the grinder body by an one-touch method. Accordingly, replacement of the polishing disk which is consumables for polishing, cutting and grinding can be simply and rapidly performed, thereby improving efficiency of work.

In addition, since the number of constituent parts of an abrasion consumable is fewer than that of the prior art, manufacturing cost can be reduced. Moreover, any accident by separation of the polishing disk in the middle of work can be prevented because the polishing disk is stably fixed by the safety keys, the rotation keys, locking members, and others, and vibration which may occur in the middle of work can be reduced.

DESCRIPTION OF DRAWINGS

Attached drawings are given for describing a hand grinder according to the present invention.

BEST MODE

Hereinafter, exemplary embodiment of the present invention will be described in detail with reference to the accompanying drawings.

FIG. 1 to FIG. 16 are views for describing overall configuration of the present invention. The present invention includes a generally used grinder body 10, a power-transmitting member 20 for transmitting torque from the grinder body 10, a stopper body 30 for detachably attaching a polishing disk D to the grinder body 10, upper and lower rotary plates 40A and 40B seated on the stopper body 30, and a disk holder 50 coupled with the polishing disk D in an integral form.

Referring to FIG. 1 to FIG. 7, a rotary shaft 11 with a screw hole 11a is provided at an end portion of the grinder body 10 and is driven at high speed by air pressure occurring with operation of an electric motor or a compressor. The power-transmitting member 20 is mounted on the rotary shaft 11, fastened to the rotary shaft 11 by a fixing bolt 12.

Figure 1:
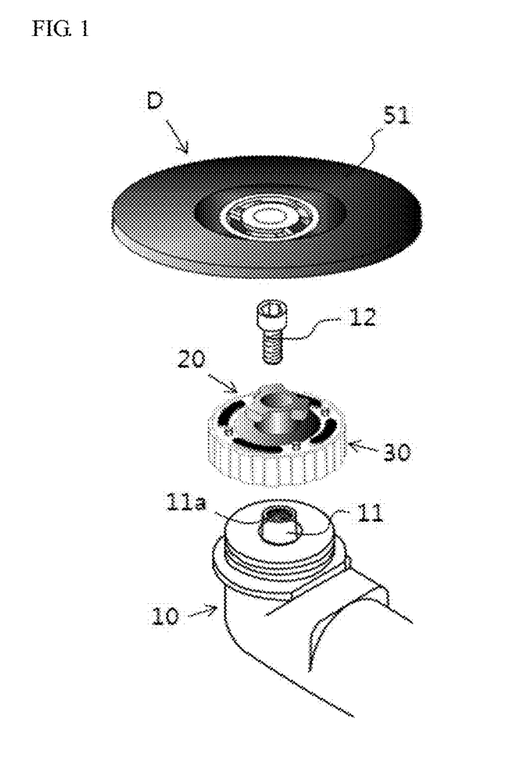
FIG. 1 is an exploded perspective view of a grinder, in which constituent parts are separated from a grinder body.
Figure 2:
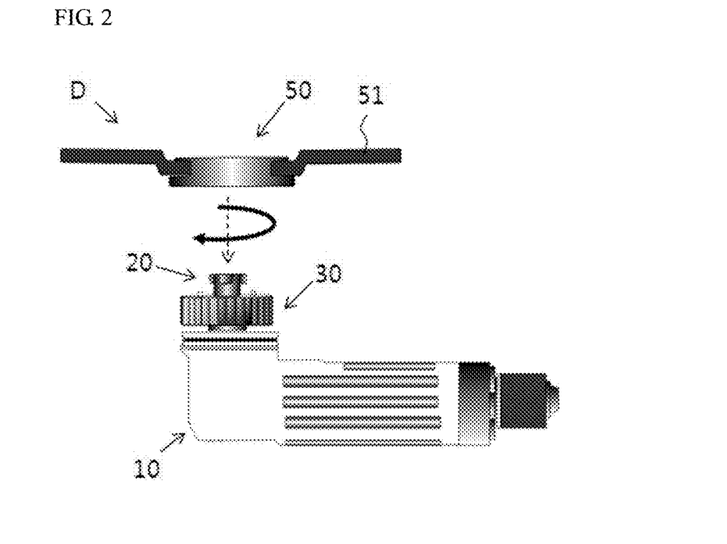
FIG. 2 is a front view for showing how to mount a polishing disk on the grinder body.
Figure 3:
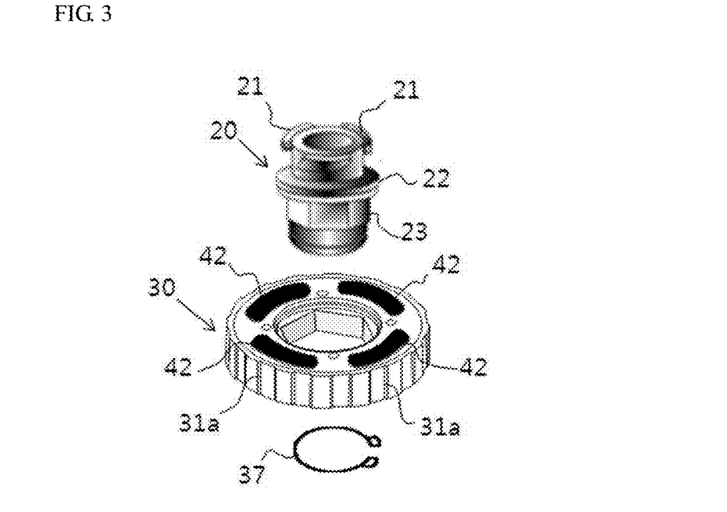
FIG. 3 is an exploded perspective view for showing a power-transmitting member and a stopper body.
Figure 4A:
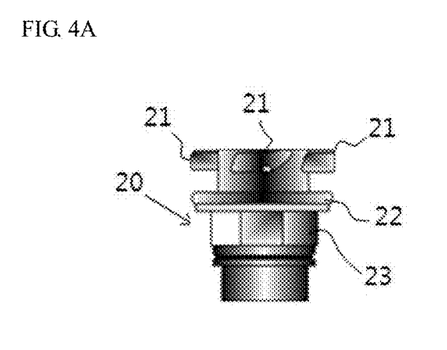
FIG. 4A is a front view of the power-transmitting member.
Figure 4B:
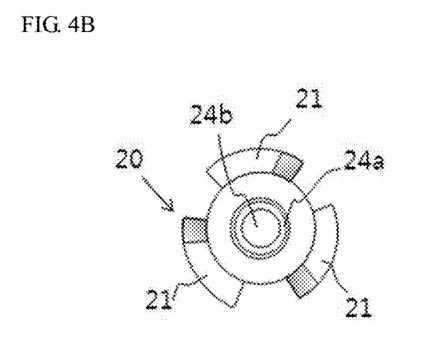
FIG. 4B is a top plan view of the power-transmitting member.

The power-transmitting member 20 for transmitting the torque from the grinder body 10 includes three catching protrusions 21 protruding from the circumferential surface of a top end of the power-transmitting member 20, with intervals of 120 degrees therebetween. The power-transmitting member 20 further includes a flange 22 formed below the three catching protrusions 21 and a hexagonal pillar 23 formed below the flange 22.

A through-hole 24b with a stepped portion 24a is provided in the power-transmitting member 20. When the fixing bolt 12 is fixed to the through-hole 24b, the power-transmitting member 20 can be fastened to the grind body 10.

Figure 5:
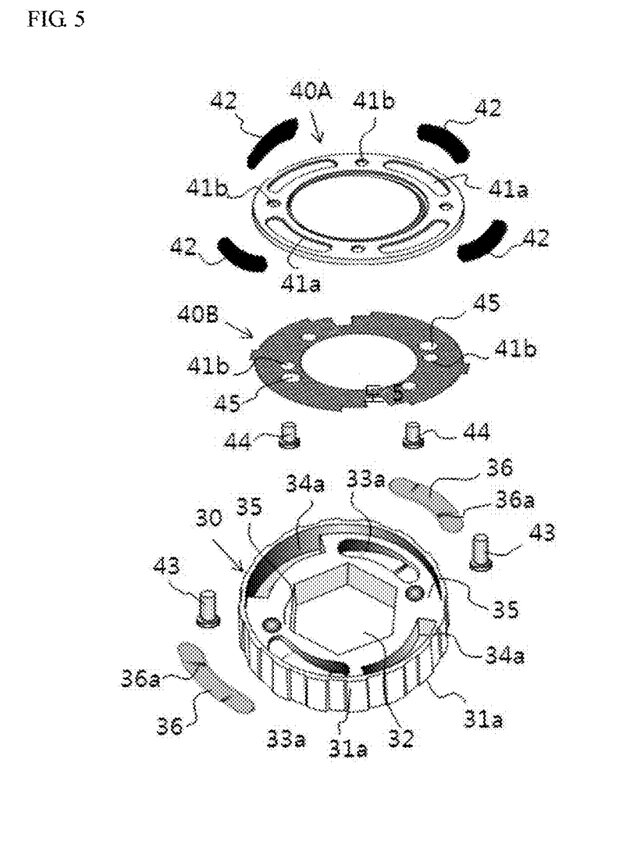
FIG. 5 is an exploded perspective view of the stopper body.

Vertical grooves 31a for preventing sliding are formed at the entire circumferential surface of the stopper body 30. A hexagonal hole 32 with a stepped portion is formed in the center of the stopper body 30. A pair of mounting grooves 33a facing each other and a pair of concave grooves 34a facing each other are provided at the outside of the hexagonal hole 32 of the stopper body 30.

A pair of ball plungers 35 are provided, each of which is positioned near a side of the mounting groove 33a. Each of the mounting grooves 33a has an inclined bottom surface, and a thin plate-shaped reinforcement plate 36 with a stepped portion 36a is provided on the bottom surface of the mounting groove 33a.

Figure 7:
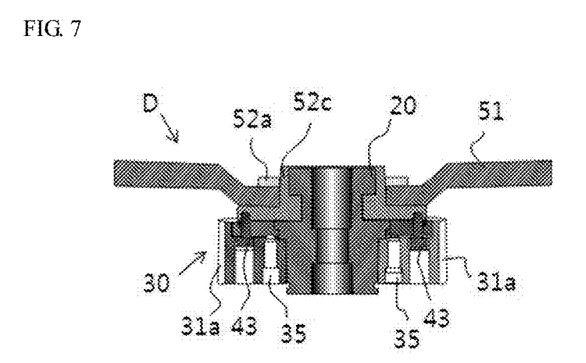
FIG. 7 is a cross-sectional view for showing a state in which the respective constituent parts are assembled.

A snap ring 37 is inserted in a slot formed at the body circumference of the power-transmitting member 20 when the hexagonal pillar 23 of the power-transmitting member 20 is assembled with the hexagonal hole 32 of the stopper body 30, whereby the power-transmitting member 20 is fastened to the stopper body 30.

The upper and lower rotary plates 40A and 40B shown in FIG. 5 are rotatably seated on the top surface the stopper body 30. Four grooves 41a are provided at the upper rotary plate 40A to receive four vibration-preventing pads 42 therein. A plurality of assembly holes 41b are provided at the upper rotary plate 40A, which a pair of safety keys 43 and a pair of rotation keys 44 are assembled with.

In other words, the upper rotary plate 40A has the four grooves 41a in which the vibration-preventing pads 42 are seated, and the assembly holes 41b into which the safety keys 43 and the rotation keys 44 are inserted. The lower rotary plate 40B has a structure corresponding to that of the upper rotary plate 40A, but further includes penetrating holes 45 where the safety keys 43 and the ball plungers 35 will be inserted or released.

In this exemplary embodiment, the upper and lower rotary plates 40A and 40B are illustrated as separate units, but they may be formed as an inseparable unit through an insert injection molding process.

Figure 6A:
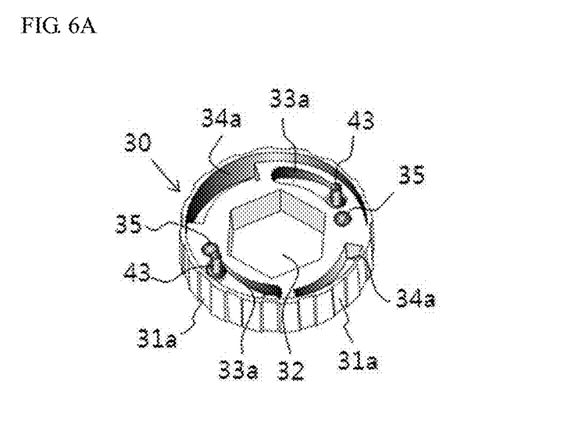
FIG. 6A and FIG. 6B are a perspective view and a partial cross-sectional view of the stopper body on which safety keys are mounted.
Figure 6B:
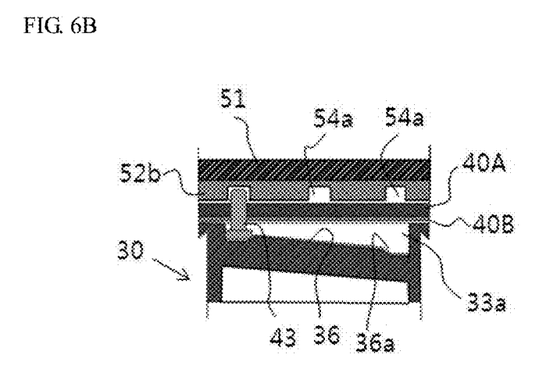

The rotation keys 44 are assembled in a state of being inserted into the assembly holes 41b of the lower rotary plate 40B, but the safety keys 43 are first disposed in the mounting grooves 33a, as shown in FIGS. 6A and 6B. In this case, since each mounting groove 33a has the inclined bottom surface and the reinforcement plate 36 with the stepped portion 36a is provided on the bottom surface of the mounting groove 33a, the safety keys 43 move upwardly and downwardly when the upper and lower rotary plates 40A and 40B rotate, while structurally and firmly maintained in the mounting grooves 33a.

Meanwhile, referring to FIG. 8 to 10C, the polishing disk D includes a disk holder 50 having an upper fixing ring 52a and a lower supporting plate 52b so as to fix an abrasive 51 therebetween.

Figure 8:
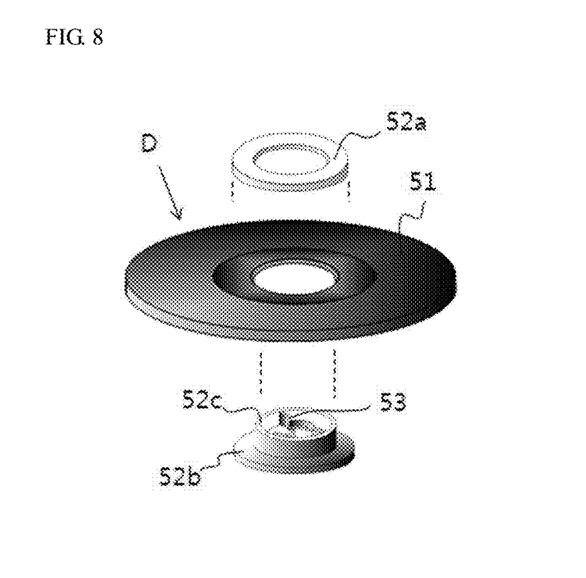
FIG. 8 is an exploded perspective view for showing a structure of the polishing disk.

The abrasive 51 may be a conventional one to which emery, corundum, garnet, or glass powder adheres, and it can be used for polishing, cutting, grinding, or the like according to the corresponding object. The polishing disk D itself is consumable goods which should be discarded after it is used at work site.

Figure 9:
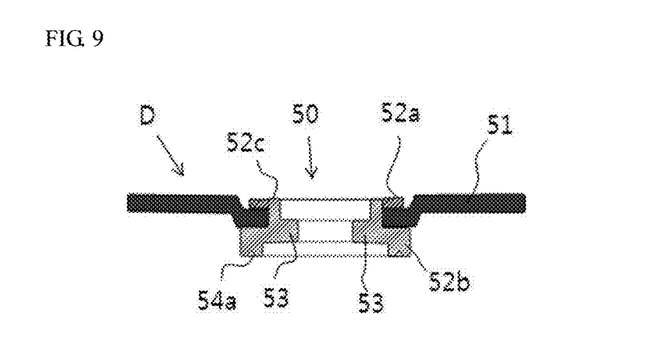
FIG. 9 is a cross-sectional view for showing an assembled state of the polishing disk of FIG. 8.

After a flange 52c of the lower supporting plate 52b and the upper fixing ring 52a are assembled with each other, they may be integrally produced with the abrasive 51 by high-strength adhesion.

Figure 10A:
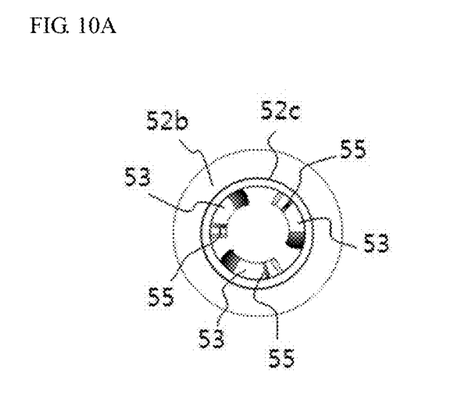
FIG. 10A and FIG. 10B are a top plan view and a bottom plan view of a lower supporting plate constituting a disk holder.
Figure 10B:
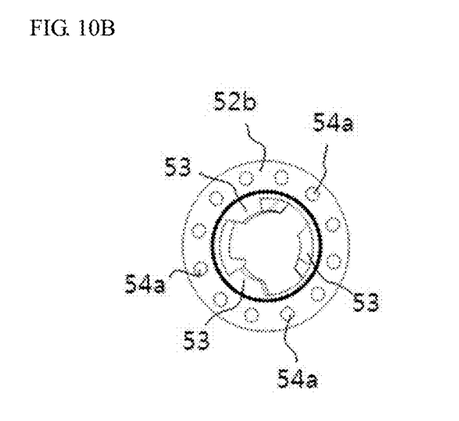

Three fastening segments 53 are provided in the flange 52c of the lower supporting plate 52b, and are engaged with three catching protrusions 21 of the power-transmitting member 20. A plurality of circular recesses 54a are provided along the circumference of the bottom surface of the lower supporting plate 52b. The safety keys 43 and the rotation keys 44 may be engaged with the circular recesses 54a when the polishing disk D are attached to or detached from the stopper body 30.

Figure 10C:
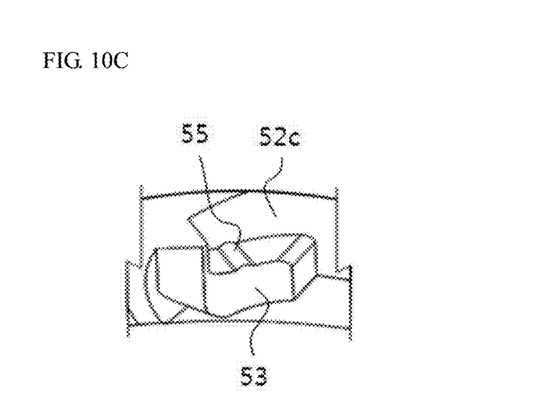
FIG. 10C is an enlarged perspective view of a fastening segment of the lower supporting plate.

Each fastening segment 53 of the lower supporting plate 52b has a protrusion 55. When the disk holder 50 of the polishing disk D is assembled with the power-transmitting member 20, the protrusions 55 help the disk holder 50 to more closely adhere to lower surfaces of the catching protrusions 21 of the power-transmitting member 20, and authentically maintains a fixing state of the polishing disk D.

Figure 11:
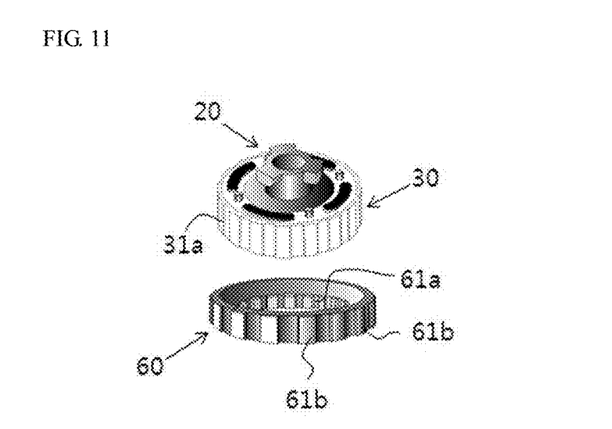
FIG. 11 is an exploded perspective view for showing a grip ring to be assembled with the stopper body.
Figure 12:
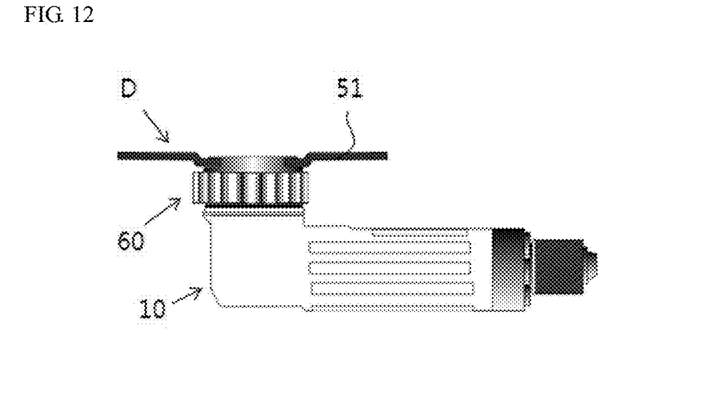
FIG. 12 is a front view of the grinder body at which the grip ring is mounted.

FIG. 11 and FIG. 12 are views for describing a modified example of the present invention. In this example, an elastic grip ring 60 is mounted on the circumferential surface of the stopper body 30 so as to prevent any sliding which may occur during work for attaching and/or detaching the polishing disk D.

Vertical protrusions 61a are formed at the inner surface of the grip ring 60, which are engaged with the vertical grooves 31a of the stopper body 30. Vertical protrusions 61b is formed at the outer surface of the grip ring 60 so that the grip ring 60 is easily mounted on the stopper body 30 from the downside toward the upside of the stopper body 30.

Meanwhile, FIG. 13 to FIG. 16 are views for describing locking members 70 installed at the circumference of the stopper body 30. The locking members 70 may be additionally provided to prevent the polishing disk D rotating at high speed from being separated from the grinder in the middle of work.

Figure 13:
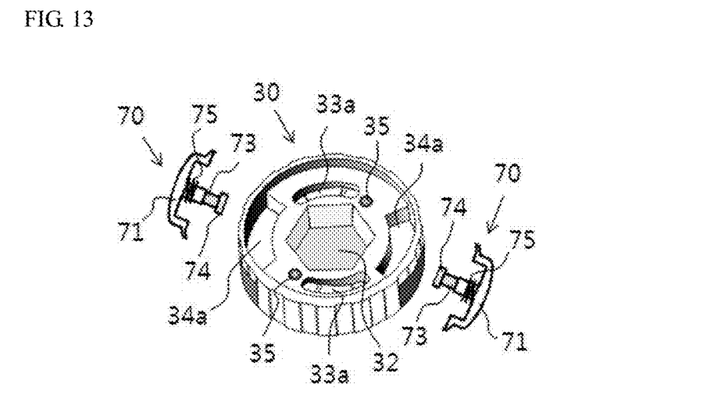
FIG. 13 is a perspective view for showing locking members to be assembled with the stopper body.
Figure 14:
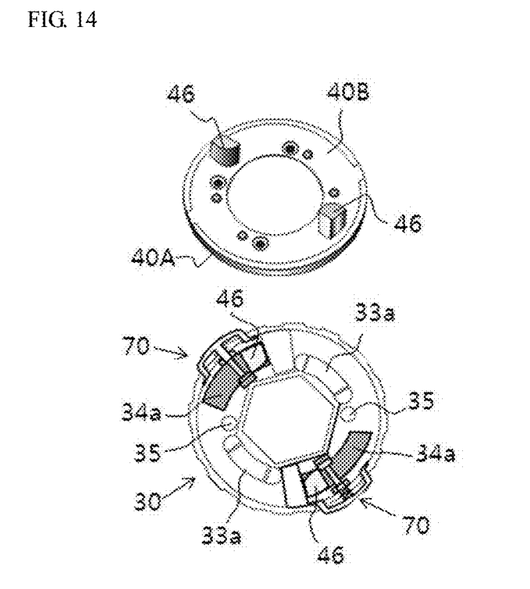
FIG. 14 is a view for showing an inner structure of a lower rotary plate and a plane structure when the locking members are assemble with the stopper body.

Each locking member 70 includes a button 71 which is mounted to be outwardly exposed from the circumference of the stopper body 30, a connection rod 703 which is integrally formed with the button 71 and is caught by a fixing segment 72 attached to the stopper body 30, a catching protrusion 74 formed at an end of the connection rod 73, and a spring 75 which supplies an elastic force to the locking member 70. Each locking member 70 is fixed by a fixing plate 76 which is mounted at a lower side of the stopper body 30.

Figure 15A:
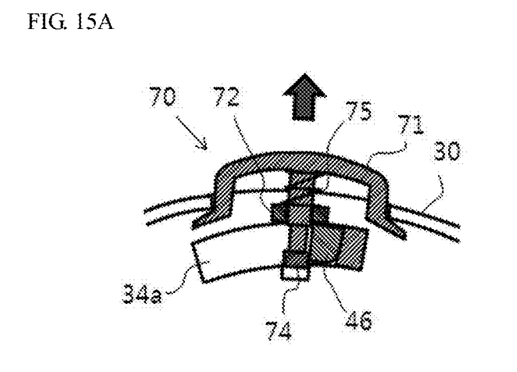
FIG. 15A and FIG. 15B are partial cross-sectional views for describing how the locking members are operated.
Figure 15B:
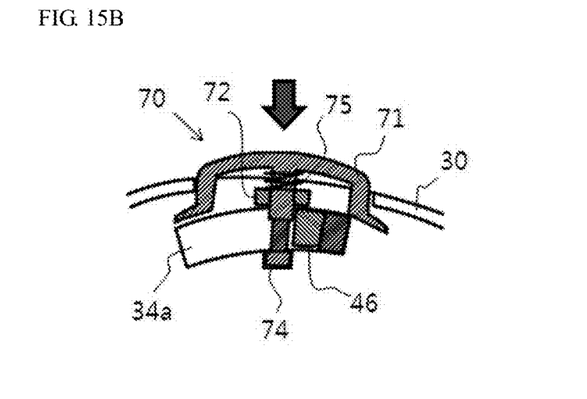
Figure 16:
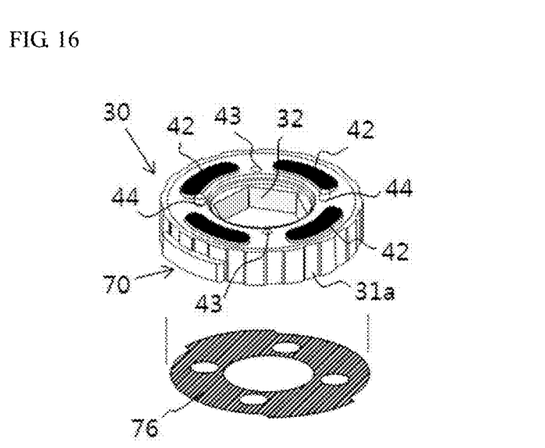
FIG. 16 is a perspective view of the stopper body assembled with the locking members.

In this structure, according to the pressing operation of the locking members 70, the catching protrusions 74 hook or release a pair of protrusions 46 which protrude downwardly from the upper rotary plate 40A seated on the stopper body 30, whereby rotation of the polishing disk D can be steadily maintained.

In the configuration described above, the rotation keys 44 are assembled with the upper and lower rotary plates 40A and 40B after the safety keys 43 are first mounted on the compensation plates 36 seated in the mounting grooves 33a of the stopper body 30, and then the upper and lower rotary plates 40A and 40B are disposed on the top of the stopper body 30. Next, the power-transmitting member 20 is assembled with the stopper body 30.

Then, such an assembled stopper module is fastened to on the rotary shaft 11 of the grinder body 10 by the fixing bolt 12, whereby the power-transmitting member 20 and the stopper body 30 are fastened to each other.

Next, in the case in which the polishing disk D should be attached to the power-transmitting member 20, a user catches the stopper body 30 with a hand, places the disk holder 50 of the polishing disk D on the power-transmitting member 20, and then turns the disk holder 50 clockwise until three fastening segments 53 formed in the flange 52c of the lower supporting plate 52b of the disk holder 50 are tightly engaged with three catching protrusions 21 of the power-transmitting member 20.

In this case, the pair of rotation keys 44 assembled with the upper and lower rotary plates 40A and 40B of the stopper body 30 are inserted into the circular holes 54a formed at the bottom of the lower supporting plate 52b, and the upper and lower rotary plates 40A and 40B are slightly rotated. As a result, the protrusions 55 formed at the fastening segments 53 of the lower supporting plate 52b are more tightly attached to the catching protrusions 21 of the power-transmitting, maintaining a fastening state of the disk holder 50 of the polishing disk D.

In addition, when the upper and lower rotary plates 40A and 40B are slightly rotated, each safety key 43 maintained in the mounting groove 33a of the stopper body 30 moves toward upper part of the inclined bottom of the compensation plate 36, and then is inserted into the circular hole 54a of the lower supporting plate 52b constituting the disk holder 50. In this case, the stepped portion 36a formed at the compensation plate 36 catches the safety key 43 to be maintained within the stepped portion 36a.

In addition, each ball plunger 35 mounted at one side of the mounting groove 33a of the stopper body 30 is inserted in the penetrating hole 45 of the lower rotary plate 40B.

According to the present invention, since the vibration-preventing pads 42 are attached to the upper rotary plate 40A mounted at the stopper body 30, the user can obtain improved assembling feeling by elasticity of the vibration-preventing pads 42 when assembling the polishing disk D with the stopper body 30. Furthermore, the vibration-preventing pads 42 reduce vibration which may occur when work is performed at high speed.

In addition, even if the rotary shaft 11 of the grinder body 10 is rotated at high speed, the polishing disk D can safely polish a surface of the object without being separated from the power-transmitting member 20.

Meanwhile, in the case in which a worn-out polishing disk D should be replaced with new one, the user catches the stopper body 30 with a hand, and then turns it counterclockwise so that three fastening segments 53 of the lower supporting plate 52b constituting the disk holder 50 can be released from three catching protrusions 21 of the power-transmitting member 20, and the safety keys 43 and the rotation keys 44 on the stopper body 30. As such, the polishing disk D can be easily separated from the stopper body 30.

Even when the elastic grip ring 60 is provided on the circumferential surface of the stopper body 30, the polishing disk D can be easily attached to or detached from the stopper body 30 in the same way described above. In this case, the grip ring 60 gives good grip feeling to the user, enabling attachment and detachment of the polishing disk D to be efficiently carried out.

Meanwhile, in the case in which the locking members 70 are provided at the circumference of the stopper body 30, the polishing disk D can't be separated from the power-transmitting member 20 if each of buttons 71 is in a state of outwardly protruding beyond the stopper body 30 as shown in FIG. 15A. This is because the catching protrusions 74 hook the protrusions 46 which protrude downwardly from the upper rotary plate 40A so that the upper and lower rotary plates 40A and 40B can't be rotated.

In contrast, if each of buttons 71 is pressed as shown in FIG. 15B, the connection rod 73 moves horizontally and elastically by the spring 75, and the catching protrusion 74 formed at an end of the connection rod 73 is thus released from the protrusion 46 of the upper rotary plate 40A. As a result, the polishing disk D assembled with the power-transmitting member 20 is separated from the power-transmitting member 20.

As described above, according to the present invention, the polishing disk can be easily attached to and detached from the grinder body by a one-touch method. Accordingly, replacement of the polishing disk which is consumables for polishing, cutting and grinding can be simply and rapidly performed, thereby improving efficiency of work.

In addition, constituent parts of the grinder are relatively simple, so manufacturing cost is reduced. Moreover, any accident by separation of the polishing disk in the middle of work can be prevented because the polishing disk is stably fixed by the safety keys, the rotation keys, locking members, and others, and vibration which may occur in the middle of work can be reduced.

Example embodiments have been disclosed herein and although specific terms are employed, they are used and are to be interpreted in a generic and descriptive sense only and not for purpose of limitation. In some examples, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A device for detachably attaching a polishing disk to a hand grinder, comprising:
    a grinder body including a rotary shaft which is driven by an operation of electric motor or air pressure;
    a power-transmitting member that includes catching protrusions protruding from a top end of a main body of the power-transmitting member, a flange formed below the catching protrusions, and a hexagonal pillar formed below the flange and that is fixed to the rotary shaft of the grinder body by a fixing bolt;
    a stopper body including a hexagonal hole that is formed at the center of the stopper body to receive the power-transmitting member therein, and arc-shaped mounting grooves that are formed at the outside of the hexagonal hole to face each other;
    an upper rotary plate and a lower rotary plate that are mounted on a top of the stopper body; and
    a disk holder that includes an upper fixing ring and a lower supporting plate which are provided to fix an abrasive therebetween and that is assembled with the power transmitting member, wherein the stopper body is assembled with a pair of safety keys that moves upward and downward on compensation plates, each of the compensation plates being mounted in each of the arc-shaped mounting grooves and having stepped portions, and the upper and lower rotary plates mounted on the stopper body are assembled with a pair of rotation keys.

2. The device of claim 1, wherein the power-transmitting member is fixed to the stopper body when a snap ring is mounted on a lower portion of the power-transmitting member.

3. The device of claim 1, wherein a bottom of the stopper body is assembled with a pair of ball plungers.

4. The device of claim 1, wherein the upper rotary plate includes grooves formed at a top thereof, and vibration-preventing pads, each of the vibration-preventing pads being mounted in each of the grooves in order to prevent the hand grinder from shaking or vibrating in the middle of work.

5. The device of claim 1, wherein the lower supporting plate of the disk holder includes circular holes formed at a bottom thereof, which safety keys are inserted in or released from when the disk holder is attached to or detached from the stopper body.

6. The device of claim 1, wherein the stopper body includes locking members that operate elastically and that hook or release a pair of protrusions protruding downwardly from the upper rotary plate.

7. The device of claim 6, wherein each of the locking members includes a button, a connection rod which is integrally formed with the button and is caught by a fixing segment attached to the stopper body, a catching protrusion formed at an end of the connection rod, and a spring which supplies an elastic force to the locking member.

* * * * *